J. BALL.

Cigar Mouth Piece.

No. 2,113. Reissued Nov. 28, 1865.

Witnesses.

J. W. Coombs

L. Cohen

Inventor.

John Ball per his Attorneys

Brown Coombs & C.

UNITED STATES PATENT OFFICE.

JONATHAN BALL, OF ELMIRA, NEW YORK.

IMPROVEMENT IN MOUTH-PIECES FOR CIGARS.

Specification forming part of Letters Patent No. 46,986, dated March 28, 1865; Reissue No. 2,113, dated November 28, 1865.

*To all whom it may concern:*

Be it known that I, JONATHAN BALL, of Elmira, in the county of Chemung and State of New York, have invented a new and Improved Mouth-Piece for Cigars; and I do hereby declare that the following is a full, clear, and exact description of the same, reference being had to the accompanying drawings, forming part of this specification.

In the manufacture of cigars in the usual way considerable skill is required for the proper formation of the "head"—that is to say, the end which is held in the mouth in smoking—and a considerable portion of the labor of the manufacture is bestowed upon this part, which, as it cannot be smoked, is thrown away, and therefore involves great waste, not only of tobacco, but of labor; and, moreover, the tobacco-head is apt to be bitten or chewed by the smoker in such manner as to interfere with the free smoking of the cigar.

The object of my invention is to obviate this waste of tobacco and of the labor consumed in the manufacture, to enable superior cigars to be made by less skillful persons, and to make the cigar smoke more freely and pleasantly; and to this end it consists in a mouth-piece composed of wood and paper, constituting an article of manufacture distinct from the cigar, but capable of being easily attached thereto by the cigar-maker.

To enable others skilled in the art to make and use my invention, I will proceed to describe it with reference to the drawings.

Figure 6:
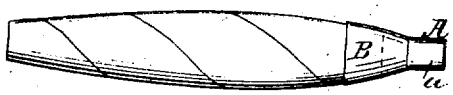
Figure 7:
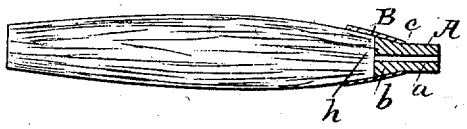
Figure 1:
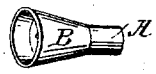
Figure 2:
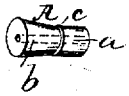
Figure 4:
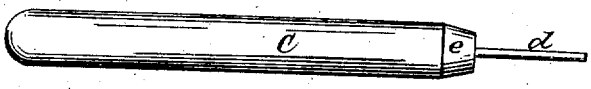
Figure 3:
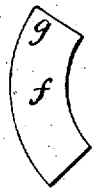
Figure 5:
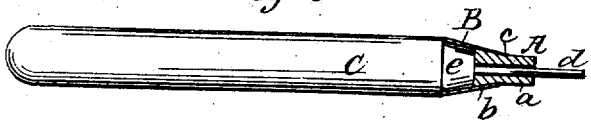

Figure 1 in the drawings is a perspective view of my improved mouth-piece. Fig. 2 is a perspective view of the wooden tube of the mouth-piece without the paper socket. Fig. 3 is a plan view of the piece of paper of which the paper socket is composed. Fig. 4 is a longitudinal view of the stick upon which the mouth-piece is finished. Fig. 5 exhibits a similar view of the said stick, with the mouth-piece in section upon it. Fig. 6 is a longitudinal outside view of the cigar with the mouth-piece attached. Fig. 7 is a central longitudinal section corresponding with Fig. 6.

Similar letters of reference indicate corresponding parts in the several figures.

The mouth-piece is composed of two pieces—viz., the short wooden tube A and the paper socket B. I prefer to use bass-wood for the tube on account of its tasteless character, and I prefer to use for the socket paper of a color corresponding with that of the cigar. The tube may be of any convenient external form; but I prefer to make the tip *a*, which is received in the mouth, of cylindrical form, and the part *b* in front conical, and to provide a slight shoulder, *c*, at the junction of the cylindrical and conical portions, as shown in Figs. 2, 5, and 7. The piece of paper represented in Fig. 3, of which the socket B is formed, is of a length somewhat greater than the circumference of the front part, *b*, of the tube, and of a width sufficiently greater than the length of the said part *b* to project in front of it far enough to form a socket of suitable depth for the reception of the end of the cigar, and the form of the said piece should be such that it may be wrapped around and stuck to the part *b*, and that its ends may lap each other and be stuck together.

In the manufacture of the mouth-piece the wooden tube A is bored centrally and longitudinally, and turned externally to the desired form, and has inserted into its central hole the pin *d*, which projects longitudinally and centrally from the end of the stick or handle C of wood or other material. (Shown in Figs. 4 and 5.) The portion *e* of this stick next the pin *d* is made of a size and shape to conform to the part *b* of the tube A and form a counterpart of the interior of the socket B. The tube, having the pin *d* inserted into it, is pushed up to the end of the stick, as shown in Fig. 5, and the strip of paper having had a suitable adhesive material applied along one edge and one end, as shown in red tint at *f g* in Fig. 3, is wrapped around the stick and tube close to the shoulder *c*, with the adhesive material *f* around in contact with the tube, and is thus formed into the socket B, as shown in Fig. 5. The mouth-piece is then complete, and is drawn off from the pin *d*.

This mouth-piece, being completed before its attachment to the cigar, constitutes a distinct and new article of manufacture.

The cigar made for the attachment of this mouth-piece is manufactured in the usual way, except that the head or mouth end is not finished to a point, but cut off square with the body, as shown at *h* in Fig. 7, to abut against the end of the tube A when inserted into the socket B. Before inserting the cigar into the socket its end is coated with adhesive material, so that the mouth-piece may be thereby firmly attached.

The adhesive material used in the formation of the mouth-piece and its attachment to the cigar should be a solution of shellac and alcohol, or some other substance or solution that would not be dissolved by the moisture of the mouth of the smoker.

Having thus described my invention, I claim as a new article of manufacture—

The mouth-piece for a cigar, composed of a wooden tube and paper socket, substantially as herein described.

JONATHAN BALL.

Witnesses:
E. B. BLAKE,
A. FITZPATRICK.